Dec. 3, 1963  R. F. THEWS  3,113,211
ENABLING DEVICE FOR COLLISION WARNING APPARATUS
Filed June 1, 1959

INVENTOR.
RICHARD F. THEWS
BY
ATTORNEY

United States Patent Office 3,113,211
Patented Dec. 3, 1963

3,113,211
ENABLING DEVICE FOR COLLISION WARNING APPARATUS
Richard F. Thews, Roseville, Minn., assignor to Minneapolis-Honeywell Regulator Company, Minneapolis, Minn., a corporation of Delaware
Filed June 1, 1959, Ser. No. 817,172
3 Claims. (Cl. 250—83.3)

This invention relates to the field of aeronautics, and specifically to equipment for warning the operator of a vehicle such as an aircraft of the presence of another aircraft moving along a collision course with him. The equipment may be part of a system in which the warning function is combined with a display function, or the warning and display functions may be separated and performed independently.

An object of the invention is to provide means displaying to an aircraft pilot the location of those aircraft which are on collision courses with him. Another object of the invention is to provide means warning an aircraft pilot that a collision hazard exists by reason of the presence of another aircraft on a collision course with him. A further object of the invention is to provide means indicating to an aircraft pilot the location of other aircraft near him, and of warning him when any of them is on a collision course with him.

Various other objects, advantages and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention.

Figure 1:
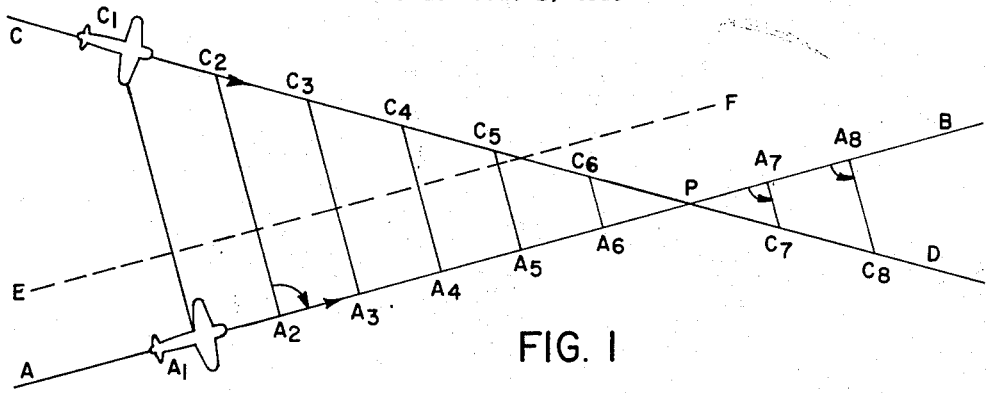
Figure 2:
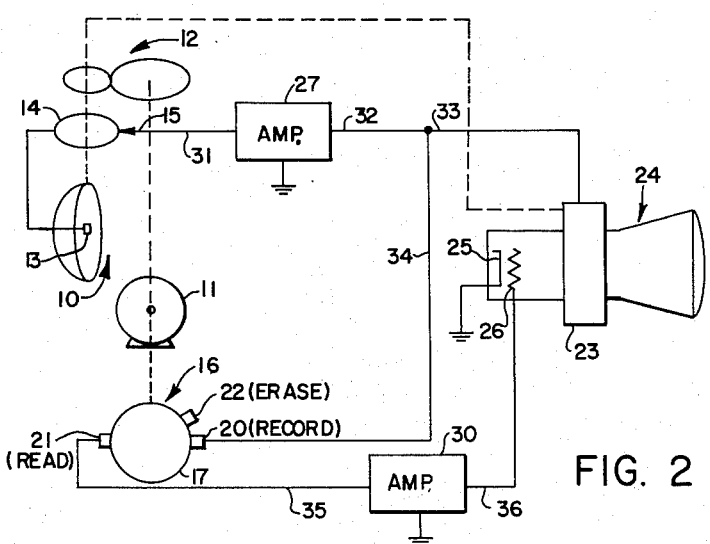
Figure 3:
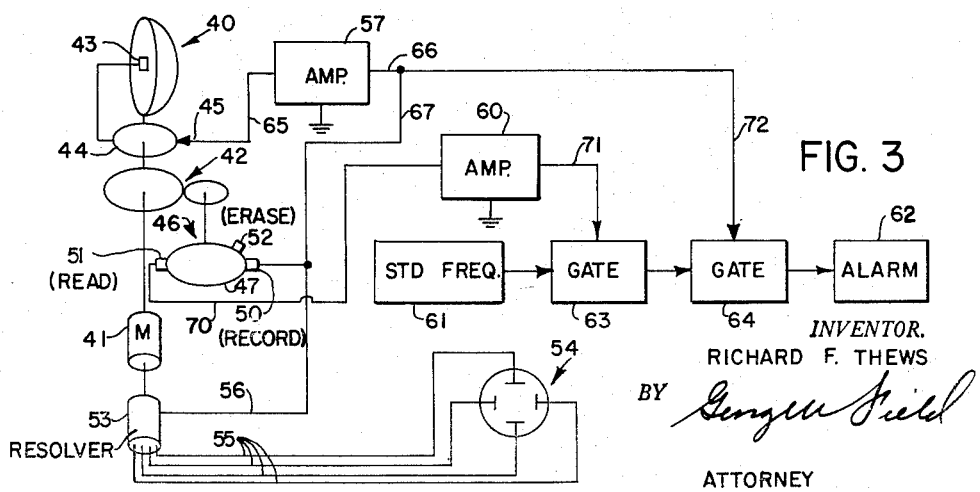

In the drawing, FIGURE 1 is a diagram showing the relation between two aircraft moving in a given area, FIGURE 2 is a schematic diagram of equipment for indicating the location of aircraft on a collision course with the aircraft carrying the equipment, and FIGURE 3 is a schematic showing of a more sophisticated apparatus which shows the location of all aircraft, and then gives a warning if any of them are on a collision course.

In the practice of my invention an observer aircraft is one carrying the equipment comprising my invention, and all other aircraft within the detecting range of the equipment are termed intruding aircraft. In FIGURE 1 there is shown an observer aircraft moving at a first speed along the straight line AB, and located at point $A_1$. An intruding aircraft is shown to be moving at a second speed along the straight line CD, and located at the point $C_1$. The aircraft are at the same altitude, and the lines AB and CD intersect at P. Obviously the two aircraft will collide at point P if they arrive there at the same time, and the course of the intruding aircraft is defined as a collision course if the intruder is moving so as to reach the point P at the same time as the observer aircraft.

It can be shown that if the bearing of the intruding aircraft from the observer aircraft remains constant, the former is on a collision course. Thus if at successive instants the observer aircraft is at points $A_2$, $A_3$, $A_4$, etc., and the intruder aircraft is at points $C_2$, $C_3$, $C_4$, etc., and the angles $PA_2C_2$, $PA_3C_3$, $PA_4C_4$, etc. are equal, the hazard of collision is present. My invention relates to means for determining that the angle PAC is invariant, and for giving suitable warning to the pilot of the observer aircraft. While my equipment also gives a warning when the intruder is following the path EF parallel to the observer aircraft at the same airspeed as the observer aircraft, or when the aircraft are moving away from point P rather than toward it, these are trivial cases and the increased complexity of equipment which would screen out these few false alarms is not believed to be justified.

A simple embodiment of my invention is shown in FIGURE 2, where a scanner 10 is continuously rotated through 360 degrees in azimuth by a motor 11, a two to one speed increase being provided by gears 12. Although its range is less than that of radar, I prefer to use an infrared scanner because of the greater angular resolution available. Scanner 10 is accordingly shown to comprise an infrared detector 13, one terminal of which may be grounded, and the other terminal of which may be connected to a slip ring 14 engaged by a brush 15.

Motor 11 is also shown to drive a recorder 16 comprising an endless magnetic recording medium 17, in the form of a belt or a surface of revolution such as a drum or a disc, driven past a recording head 20, a reading head 21, and an erase head 22. Also driven with scanner 10 is the rotating deflection coil 23 of a cathode ray oscilloscope 24, having a cathode 25 and a grid 26 which is normally blanked by conventional means not shown. The equipment further includes a pair of amplifiers 27 and 30.

Brush 15 is connected to the input of amplifier 27 by conductor 31. The output of amplifier 30 is connected to deflection coil 23 by conductors 32 and 33, and to recording head 20 by conductors 32 and 34. Reading head 21 is connected to the input of amplfier 30 by conductor 35, and the output of amplifier 30 is connected to grid 26 by conductor 36, to unblank the cathode ray oscilloscope when amplifier 30 receives an input.

The operation of FIGURE 2 is the same whether used in a cooperative system—where the intruder aircraft carry infrared beams, in a passive system—in which the observer aircraft detects the intruder aircraft by their natural infrared radiation, or in an active system—in which the observer aircraft radiates infrared energy in all directions and detects the intruder aircraft by the reflection of the transmitted energy. Motor 11 continuously drives scanner 10, deflection coil 23, and recorder 16, the latter at half the speed of the former two. Whenever the scanner is directed toward an intruder aircraft, an infrared signal is received by detector 13 and transmitted to amplifier 27. Amplifier output is impressed on recording head 20 and is also fed to deflection coil 23.

By the time the scanner has completed a 360 degree scan the recording medium has moved from recording head 20 to reading head 21, and if the intruder aircraft is at the same bearing from the observer, a second signal is supplied to amplifier 27, simultaneously with the transmission of a recorded signal to amplifier 30. Amplifier 30 unblanks the cathode ray tube, and amplifier 27 deflects the resulting beam in a direction determined by the bearing of the intruder aircraft to give a pip observable by the pilot as an indication of a collision hazard.

Thus whenever there is an intruder aircraft the deflection coil is energized, and a record is made, and whenever a recorded signal is read the oscilloscope is unblanked. The result is that as long as no intruding aircraft has an invariant bearing with respect to the observer aircraft, the oscilloscope shows simply a succession of spots at its center, as successive recorded signals are read: deflection does not take place when the oscilloscope is blanked because there is no beam to deflect.

The embodiment of the invention shown in FIGURE 2 has the imperfection of requiring considerable pilot attention. An improvement shown in FIGURE 3 avoids this difficulty. Here a scanner 40 like scanner 10 is driven by a motor 41, and a recorder 46 like recorder 16 is also driven by motor 41, a two to one speed decrease being provided by gears 42. Scanner 40 includes infrared detector 43 connected through slip ring 44 to brush 45. Recorder 46 includes a recording medium 47, a recording head 50, a reading head 51, and an erase head 52. Motor 41 also drives a resolver 53 which acts to control the direction of deflection of the beam of an electrostatically deflected cathode ray oscilloscope 54, by supplying on a set of four conductors 55 four signals in phase quadrature, when a signal is supplied on an input conductor 56. The equipment includes a pair of amplifiers 57 and 60, and a standard frequency generator 61 which energizes an alarm 62 when a pair of normally closed gate circuits 63 and 64 are both open at the same time.

Brush 45 is connected to the input of amplifier 57 through conductor 65, and the output of amplifier 57 is supplied to recording head 50 through conductors 66 and 67, and to resolver 53 through conductors 66, 67 and 56. Reading head 51 is connected to the input of amplifier 60 through conductor 70. The output of amplifier 60 is supplied through conductor 71 to open gate 63, and the output of amplifier 57 is supplied through conductors 66 and 72 to open gate 64.

The system of FIGURE 3 operates as follows. Whenever a signal is received by detector 43, amplifier 57 opens gate 64, causes a deflection of the beam of oscilloscope 54 through resolver 53, and records a signal on medium 47. Whenever a recorded signal reaches reading head 51 gate 63 is opened. Thus, although oscilloscope 54 shows all intruding aircraft within range of the equipment, it is only when the bearing of one or more intruding aircraft is invariant that both gates are oepned and alarm 62 is operated, to direct the attention of the pilot to the hazardous condition which has developed.

Numerous objects and advantages of my invention have been set forth in the foregoing description, together with details of the structure and function of the invention, and the novel features thereof are pointed out in the appended claims. The disclosure, however, is illustrative only, and I may make changes in detail within the principle of the invention, to the full extent indicated by the broad general meaning of the terms in which the appended claims are expressed.

I claim as my invention:

1. In combination: means for giving an indication representative of the direction of an intruding craft from an observing craft; and means preventing the operation of said first named means as long as said direction is changing.

2. In combination: means for giving an indication representative of the direction of an intruding craft from an observing craft; means normally preventing the operation of the first named means; and means disabling the last named means when said direction is invariant.

3. In combination: an oscilloscope including a viewing screen, an electron gun for emitting a beam of electrons directed to impinge on said screen at a predetermined point, and means energizable to prevent said beam from reaching said screen; rotatable means energizable to displace said beam radially of said point at an angle determined by the rotation thereof; means normally energizing said energizable means; means connected to said rotatable means for causing operation thereof representative of the direction of an intruding craft with respect to an observing craft; and means connected to the first named means for disabling it whenever said direction is invariant.

References Cited in the file of this patent

UNITED STATES PATENTS

| | | |
|---|---|---|
| 1,410,626 | Taylor | Mar. 28, 1922 |
| 2,410,424 | Brown | Nov. 5, 1946 |
| 2,431,625 | Tolson | Nov. 25, 1947 |
| 2,684,468 | McClure | July 20, 1954 |
| 2,698,433 | Ringoen | Dec. 28, 1954 |
| 2,842,760 | McLucas | July 8, 1958 |
| 2,918,581 | Willey et al. | Dec. 22, 1959 |
| 2,957,082 | Plass | Oct. 18, 1960 |
| 2,969,539 | Miner | Jan. 24, 1961 |
| 2,993,121 | Esher | July 18, 1961 |
| 2,994,867 | Pierce | Aug. 1, 1961 |
| 3,030,546 | Ohlmann et al. | Apr. 17, 1962 |
| 3,040,314 | Hesse | June 19, 1962 |

FOREIGN PATENTS

| | | |
|---|---|---|
| 384,325 | Great Britain | Dec. 5, 1932 |
| 494,667 | Great Britain | Oct. 25, 1938 |

OTHER REFERENCES

Osborne: Airborne Infrared Warning System Measures Range, Electronics, July 1, 1957, pp. 190–192.

Klass: Infrared To Get Collision Warning Trial, Aviation Week, August 12, 1957, vol. 66, pages 77 to 84.

Karwath: Collision and the Airlines, Journal of the Institute of Navigation, January 1958, pp. 56–64.